Figure 1:
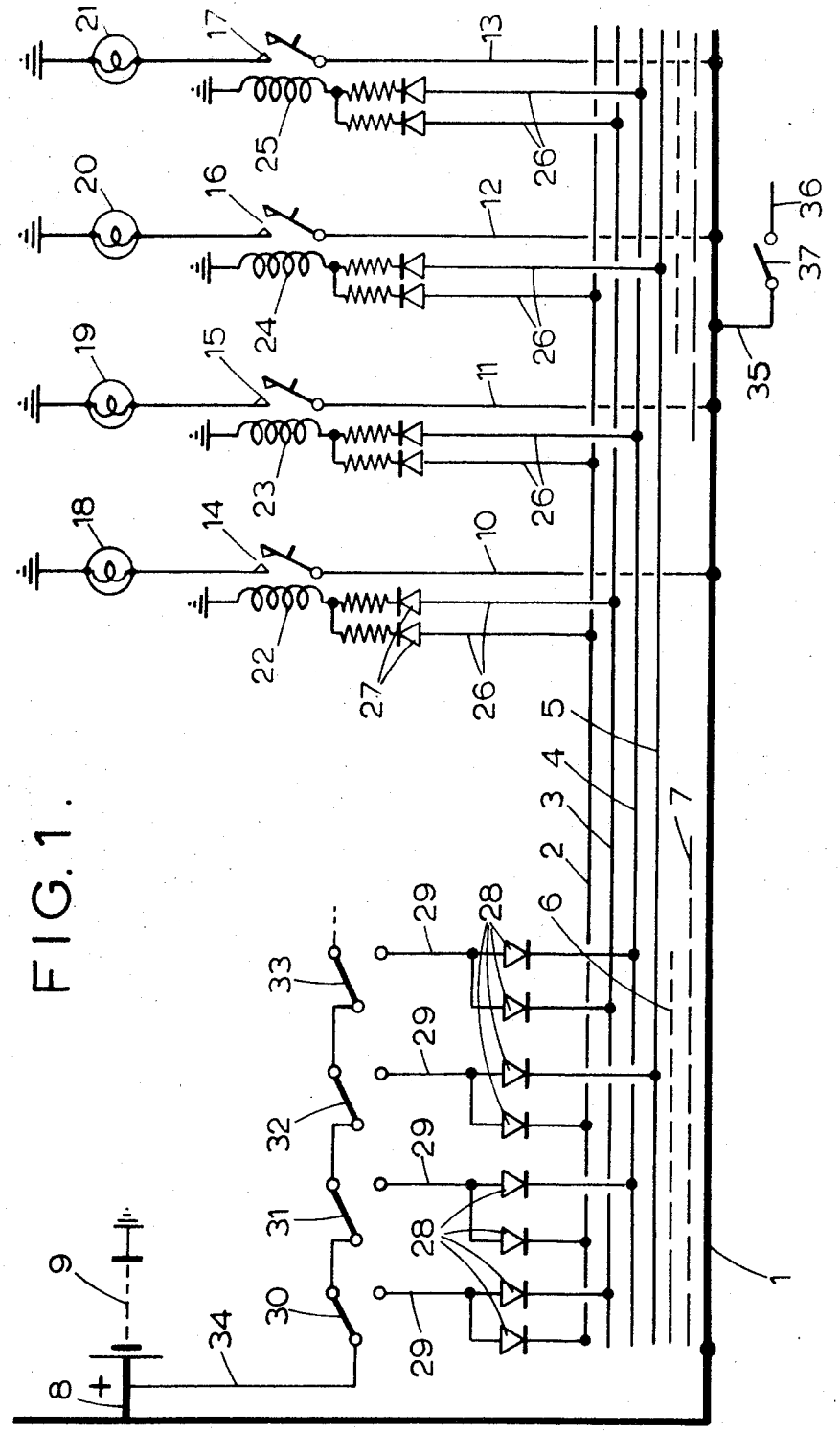

United States Patent [19]
Wright

[11] 3,745,419
[45] July 10, 1973

[54] ELECTRICAL WIRING SYSTEM
[75] Inventor: Frank Wright, Coventry, England
[73] Assignee: Jaquar Cars Limited, Coventry, England
[22] Filed: Apr. 9, 1971
[21] Appl. No.: 132,814

[30] Foreign Application Priority Data
Apr. 10, 1970 Great Britain.................... 17,053/70

[52] U.S. Cl. ............ 317/137, 307/10 R, 307/10 LS
[51] Int. Cl. ............................................. H02g 3/00
[58] Field of Search............................ 317/134, 137;
340/176, 347 DD, 166 R, 167 R, 167 P, 166 S, 163; 307/29, 38, 40, 115, 139, 140, 10 R, 10 LS

[56] References Cited
UNITED STATES PATENTS
1,535,360  4/1925  Vickery .......................... 317/157 X
3,544,803  12/1970  Taylor............................. 307/140 X
3,564,280  2/1971  Sognefest....................... 307/10 R X
2,957,168  10/1960  Dempsey et al. ............... 340/176 X FOREIGN PATENTS OR APPLICATIONS
1,955,880  6/1970  Germany ........................... 317/157
1,146,170  12/1961  Germany ........................... 340/176

Primary Examiner—J. D. Miller
Assistant Examiner—Harry E. Moose, Jr.
Attorney—Stowell & Stowell

[57] ABSTRACT

A motor vehicle electrical system includes a ring main for supplying power to the various loads and also a plurality of signal lines which are connectable in unique pairs to the vehicle battery in order to energize control devices associated with the loads so that energization of a particular control device causes power to be supplied to the associated loads from the ring main.

6 Claims, 2 Drawing Figures

ELECTRICAL WIRING SYSTEM

The invention relates to an electrical supply system, particularly, but not exclusively, for motor vehicles.

According to the present invention an electrical system, for energizing any one of a plurality of loads, comprises the following combination of features:
  a. a single power supply line from which each load can be energized by the operation of a control device associated with it;
  b. a plurality of signal lines adapted to carry current for energizing the control devices; and
  c. a plurality of switches associated with the loads respectively, each switch when operated energizing a unique combination of at least two of the plurality of signal lines so as to cause energization of the associated control device.

According to one aspect of the invention an electrical system for energizing any one of a plurality of loads comprises the following combination of features:
  a. a single power supply line is connected to a battery;
  b. each of a plurality of loads is connectable to the power line through normally open contacts of an associated relay;
  c. each relay is connected to a unique combination of two lines of a plurality of signal lines; and
  d. each signal line is connectable to the battery through an associated switch such that closure of the switch brings the two associated signal lines into circuit with the associated relay coil to energize the latter and thereby close its contacts.

According to a further aspect of the invention in a motor vehicle electrical system which comprises the following combination of features:
  a. a single power supply line from which each load can be energized by the operation of a control device associated with it;
  b. a plurality of signal lines adapted to carry current for energizing the control devices; and
  c. a plurality of switches associated with the loads respectively, each switch when operated energizing a unique combination of at least two of the plurality of signal lines so as to cause energization of the associated control device,
further loads are connected directly to the signal lines by single feeder lines so that the further loads are energized whenever that line is not being used to energize a control device. The further loads could comprise instruments.

Figure 2:
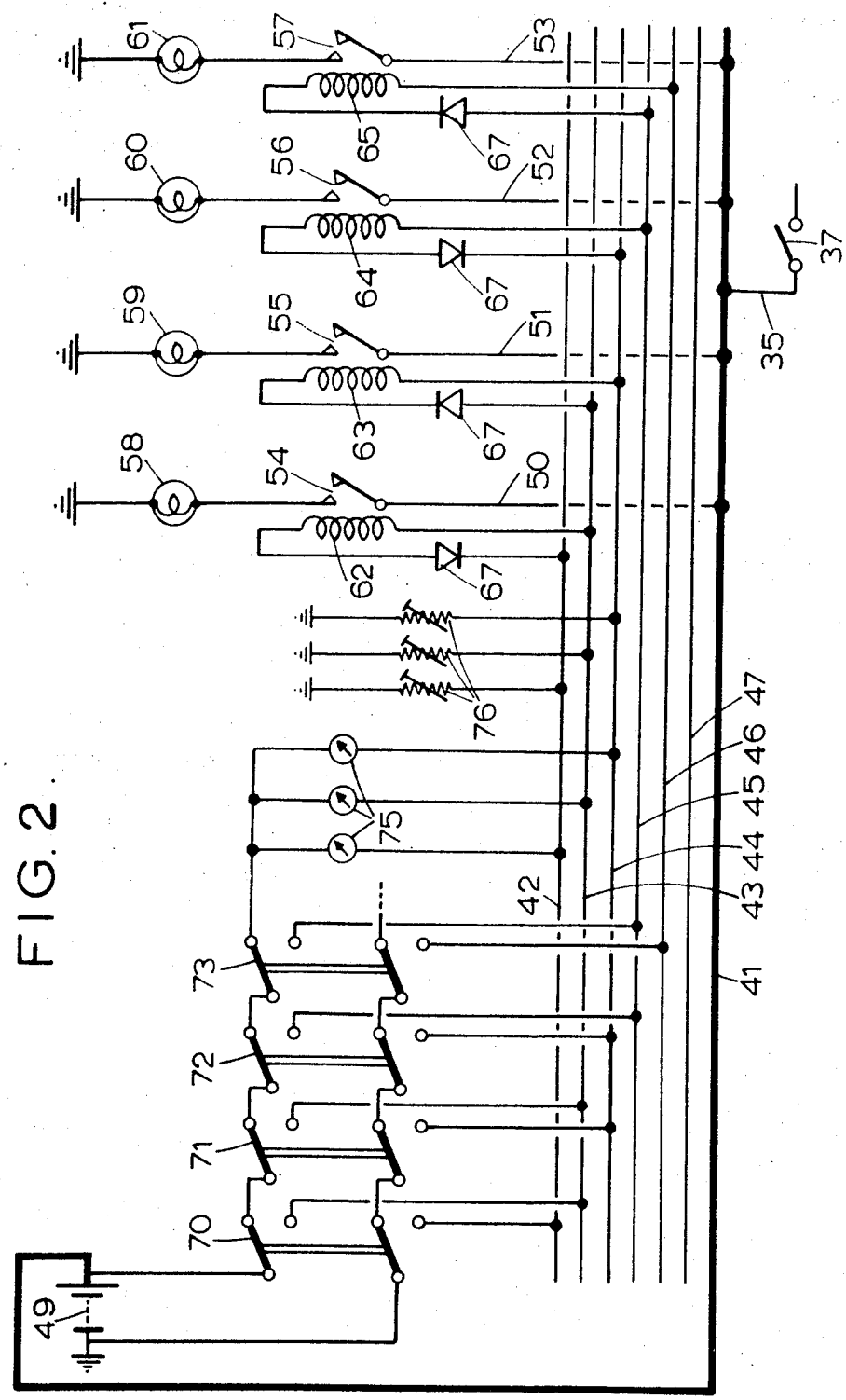

How the invention may be carried out will now be described, by way of example only and with reference to the accompanying drawings in which:

FIG. 1 is a circuit diagram of a first electrical system, for use in a motor vehicle; and FIG. 2 is a circuit diagram of a second electrical system, for use in a motor vehicle.

FIGURE 1

A portion of a power supply line 1 is shown. This line may be of any desired length or shape and be a closed ring main or be open, ie. it may be an open loop of any desired configuration or laid in a line or lines. Parallel with the supply line 1 is a plurality of signal lines 2 to 7 for energizing relays 22 to 25. Although six signal lines have been shown, there may be less or more. The signal lines 2-7 are preferably of the same length and follow the same configuration as the supply line 1. At one end of the supply line 1 a connection 8 is made to one terminal of a battery or other electrical supply 9. The other terminal of the battery is connected to an earth return, e.g. the vehicle chassis. At desired positions in the length of the supply line 1 feeder lines, of which four 10 to 13 are shown, are connected. There may be any number of such feeder lines 10 to 13. Each feeder line includes normally open contacts 14 to 17 of relays 22 to 25 controlling the supply of current from the line 1 to a load 18, 19, 20 or 21 respectively. Each load is connected to the earth return, eg. to the vehicle chassis. Each relay is connected to a unique pair of the signal lines 2 to 7 by means of tappings 26. Each tapping 26 includes a computor-type diode and resistor and gate 27 permitting electrical current to flow only in the direction from the tappings 26 to the relays 22 to 25. The latter are also connected to the common earth return. At a remote position along the length of the signal lines 2 to 7, tappings are taken through diodes 28 to a plurality of control switches of which four 30 to 33 are shown. The diodes 28 together with the diodes 27 prevent spurious signals being transmitted from the switches to incorrect relays. The switches 30 to 33 are so arranged that when they are in their normally open positions, as shown, they are connected in series with each other and also by conductor 34 to the battery connection 8 and to the supply line 1. The tappings 29 are connected to different combinations of any two of the signal lines 2 to 7. Therefore with the six signal lines 2 to 7 there are 15 different ways in which the tappings 29 can be connected and therefore 15 different switches such as 30 to 33 can be provided. The tappings 26 leading to the relays 22 to 25 are connected to corresponding pairs of the signal lines 2 to 7 and therefore it is possible for fifteen relays such as 22 to 25 to be provided, each being operable by a different one of the switches such as 30 to 33. By having different numbers of relay-energizing signal lines such as 2 to 7, and taking combinations of two or more tappings therefrom, different numbers of switches, such as 30 to 33, and associated relays, such as 22 to 25, can be provided.

As the switches 30 to 33 are connected in series in their open positions, when any one of the switches has been moved to a closed position, any of the other switches which are downstream of that switch, ie. to the right in FIG. 1, is prevented from effecting operations of its associated relay. The switches are preferably biased into their illustrated positions in which they are open and therefore current is only temporarily passed along the relevant lines 2 to 7 while the appropriate switch 30 to 33 is depressed. The relays 22 to 25 may be of the pulse type, but they are preferably of the bistable kind, whereby a first signal applied through the appropriate switch 30 to 33 will energize the corresponding relay 22 to 25 and the next closure of the switch 30 to 33 will de-energize the relay 22 to 25 and so on successively. This has the advantage that as all the switches 30 to 33 are normally open, the relay contacts 14 to 17 will remain in either their closed or open positions until the next operation of the corresponding switch 30 to 33 and also the lines 2 to 7 will only carry current when the appropriate switch 30 to 33 has been temporarily closed. Therefore, the lines 2 to 7 can at all times, except during temporary closure of a switch 30 to 33, be used for carrying current for other purposes, eg. for transmitting signals to instruments.

The operation of the system is as follows. Assuming that the switch 30 is temporarily closed, the lines 2 and 3 will temporarily pass current and this will be applied to the relay 22. As current is flowing through both of the tappings 26 associated with the relay 22 it will be energized to effect closure of the relay contacts 14 and energization of the corresponding load 18. After release of the switch 30, the relay contacts 14 will remain closed until the switch 30 has again been depressed to cause actuation of the relay 22. The relays 22 to 25 are of the kind requiring energizing current to pass through both of the tappings 26 before the relay will be energized and as diodes 28 and 27 are provided, the relay 22 will not be influenced by spurious signals passing through either of the signal lines 2 or 3 from any of the other signal lines.

Similarly, when the switch 31 is closed, the signal lines 2 and 4 will pass current and will energize only the relay 23; when the switch 32 is closed, the lines 2 and 5 only will pass current, thereby energizing only the relay 24; when the switch 33 is closed, the lines 3 and 4 only will pass current, thereby energizing only the relay 25. As aforesaid, there are fifteen possible combinations of selecting any two of the six lines. If two switches are inadvertently depressed at the same time, only the one nearer to the conductor 34 will effect operation of the corresponding relay.

The supply line 1 may also be used for supplying feeder lines such as 35 for operating loads 36 through local switches 37, the load being connected also to the earth return. The feeder lines such as 35 may be provided anywhere in the length of the supply line 1.

The supply line 1 and the signal lines 2 to 7 may conveniently be arranged side-by-side in an extrusion of an insulating material such as rubber or a synthetic plastics material ie. as a single cable. The cross-sectional shape of the extrusion may be asymmetrical, thereby preventing incorrect connection to any one of the lines 1 or 2 to 7. The feeder lines such as 10 to 13 and the associated relay tappings 26 may likewise be formed in extrusions or in blocks of insulating material. Each of these may be of peculiar shape so that it can only be connected with its tappings 26 in contact with the appropriate lines 2 to 7. Alternatively, each extrusion or block carrying a feeder line, such as 10 to 13, and the associated tappings 26 may be of uniform cross-sectional shape, the connection between the tappings 26 and the appropriate lines 2 to 7 being made through an adaptor of peculiar shape.

FIGURE 2

A supply line 41 and associated signal lines 42 to 47 similar to signal lines 1 to 7 respectively in FIG. 1 are arranged to form a ring main or other required layout. As in FIG. 1, the supply line 41 is connected to one terminal of a battery or other electrical supply 49. Also, the supply line has a plurality of feed lines such as 50 to 53 connected to it at desired positions along its length. Each feed line includes the normally open contacts such as 54 to 57 of relays 62 to 65 through which current can be supplied to loads 58 to 61. The loads are each connected via an earth return, eg. through a vehicle chassis, to the other terminal of the battery 49. The system showed in FIG. 2 differs from that shown in FIG. 1 in that control switches such as 70 to 73 are of the double-pole type instead of being of the single pole type. The switches 70 to 73 are shown in their open positions to which they are biased and are connected in series with each other. The switches are connected, when closed, to connect the battery 49 or other battery or source of electricity to different pairs of the signal lines 42 to 47, e.g. the switch 70 connects the battery to lines 42 and 43; the switch 71 connects the battery to lines 43 and 44; the switch 72 connects the battery to lines 44 and 45 and the switch 73 connects the battery to lines 45 and 46. The different pairs of lines 42 to 47 are connected to the relays 62 to 65, so that on closure of the appropriate switch 70 to 73, one of the relays will be connected in series with the battery through the appropriate switch and pair of signal lines. A diode 67 is connected in series with each relay to enable the signal lines 42 to 47 to be common to more than one selected pair of the signal lines. With six signal lines 42 to 47 and by connecting the diodes 67 in alternatively reversed directions, as shown, twelve combinations of two signal lines are possible and by reversing the polarity of the battery the number of possible combinations can be increased. One signal line of each pair acts as a supplier of current for the battery and the other as a return to the battery. As in FIG. 1, the relays are conveniently of the bi-stable kind so that each time a switch 70 to 73 is closed, the corresponding contacts 54 to 57 of the associated relay will be open or closed. Therefore, as in FIG. 1, the signal lines 42 to 47 will only be used for controlling a relay while a switch 70 to 73 is temporarily closed. Thus the lines 42 to 47 can also be used for carrying current to instruments such as 75 when all the switches 70 to 73 are in their closed positions as illustrated. The instruments 75 can be adjusted by trimming resistors 76 connected in series with the instruments, one set of poles of the switches 70 to 73 and the battery 49 by appropriate lines 42 to 47 and the earth return.

As in FIG. 1, the supply line 41 can also be used to supply current to an auxiliary feeder circuit such as 35 and having a local switch 37 instead of a remote switch, such as 70 to 73.

Although the electrical supply systems shown in FIGS. 1 and 2 are especially suitable for motor vehicles, they may be used in many other applications, for example in airplanes, ships or buildings.

The devices used to control the supply of current to the loads from the supply line, referred to in the claims as "control devices," are shown in the drawings as being relays. However, the invention is not limited to such control devices as others could be used, for example solid state devices such as transistors or triacs.

I claim:

1. An electrical system adapted for use in an automobile, including,
    a. a plurality of control devices each requiring plural inputs thereto for actuation, and adapted to each control the energization of an associated electrical load,
    b. a plurality of signal lines connected to and adapted to energize the control devices,
    c. a plurality of control switches, each control switch energizing a unique combination of said signal lines,
    d. each said unique combination of signal lines in turn connected to and energizing only a unique, corresponding control device, e. the total number of signal lines being greater than the number in said unique combination.

2. The electrical system of claim 1 including a return line for each control device, said return lines being separate from said signal lines.

3. The electrical system of claim 1 in which each said control device is connected to its unique combination of signal lines through a plurality of diodes, one diode located in each connection.

4. The electrical system of claim 3 wherein each control switch, when actuated, passes current to said unique combination of signal lines through a single conductor, in turn connected to said unique combination of signal lines through diodes.

5. The electrical system of claim 1 wherein said control devices are bistable relays.

6. The electrical system of claim 1 wherein said control switches are normally biased open and define a series path when open.

* * * * *